US011875982B2

(12) United States Patent
Lai et al.

(10) Patent No.: US 11,875,982 B2
(45) Date of Patent: Jan. 16, 2024

(54) MULTI-MODAL IONIZATION FOR MASS SPECTROMETRY

(71) Applicant: BaySpec, Inc., San Jose, CA (US)

(72) Inventors: Nam Duc Lai, San Jose, CA (US); Krisztian Gabor Torma, San Jose, CA (US); Ming Chai, Union City, CA (US); William Allen Escobar, San Jose, CA (US); Xiaoguang Wu, San Jose, CA (US); Masayuki Kamata, Sunnyvale, CA (US); Wei Yang Terziyan, Los Altos Hills, CA (US)

(73) Assignee: BaySpec, Inc., San Jose, CA (US)

( * ) Notice: Subject to any disclaimer, the term of this patent is extended or adjusted under 35 U.S.C. 154(b) by 0 days.

(21) Appl. No.: 18/111,260

(22) Filed: Feb. 17, 2023

(65) Prior Publication Data

US 2023/0207301 A1 Jun. 29, 2023

Related U.S. Application Data

(63) Continuation of application No. 17/389,123, filed on Jul. 29, 2021, now Pat. No. 11,621,155.

(51) Int. Cl.
*H01J 49/00* (2006.01)
*H01J 49/10* (2006.01)

(52) U.S. Cl.
CPC ........ *H01J 49/107* (2013.01); *H01J 49/0031* (2013.01)

(58) Field of Classification Search
CPC ............................ H01J 49/107; H01J 49/0031
USPC ......................................... 250/281, 282, 288
See application file for complete search history.

(56) References Cited

U.S. PATENT DOCUMENTS

| | | | | |
|---|---|---|---|---|
| 7,411,186 | B2 * | 8/2008 | Mordehai | H01J 49/107 250/281 |
| 2013/0140453 | A1 * | 6/2013 | Verenchikov | H01J 49/107 250/281 |
| 2013/0260478 | A1 * | 10/2013 | Ewing | G01N 33/0057 436/501 |
| 2015/0235829 | A1 * | 8/2015 | Chung | C23C 16/52 250/288 |
| 2016/0300703 | A1 * | 10/2016 | Hasegawa | H01J 49/168 |
| 2018/0366310 | A1 * | 12/2018 | Wolf | H05H 1/2406 |
| 2020/0258734 | A1 * | 8/2020 | Denis | G01N 27/68 |
| 2021/0151309 | A1 * | 5/2021 | Wolf | H01J 49/105 |
| 2023/0035895 | A1 | 2/2023 | Lai et al. | |

OTHER PUBLICATIONS

U.S. Appl. No. 17/389,123, Non Final Office Action dated Aug. 18, 2022.
U.S. Appl. No. 17/389,123, Notice of Allowance dated Dec. 8, 2022, 7 pgs.
U.S. Appl. No. 17/389,123, Response filed Nov. 18, 2022 to Non Final Office Action dated Aug. 18, 2022, 9 pgs.

* cited by examiner

*Primary Examiner* — Michael Maskell
(74) *Attorney, Agent, or Firm* — Schwegman Lundberg & Woessner, P.A.

(57) ABSTRACT

Techniques and systems for multi-modal ionization for mass spectrometry are provided. In some embodiments, a method may comprise: receiving an analyte; ionizing some molecules of the analyte using a first ionization method to produce first ions; ionizing other molecules of the analyte using a second ionization method to produce second ions; and providing the first and second ions to a mass analyzer.

19 Claims, 13 Drawing Sheets

700C

700D

MULTI-MODAL IONIZATION FOR MASS SPECTROMETRY

CLAIM OF PRIORITY

This application is a continuation of and claims the benefit of priority under 35 U.S.C. § 120 to U.S. patent application Ser. No. 17/389,123, filed on Jul. 29, 2021, which is incorporated by reference herein in its entirety.

BACKGROUND

Mass spectrometers may be used to measure atoms and molecules to determine their mass or weight. This mass or weight information may be used to identify unknown compounds, quantify known compounds, and determine structure and chemical properties of the molecules. Mass spectrometry techniques may place a charge on the molecules of interest (analyte) and then measure how the trajectories of the resulting ions respond in vacuum to various combinations of electric and magnetic fields. A significant aspect of mass spectrometry is the conversion of neutral analyte molecules into ions. For some analytes, the ionization may be accomplished with gas-phase encounters between the neutral molecules and electrons, photons, or other ions.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Overview

The present disclosure describes systems and techniques for multi-modal ionization for mass spectrometry. Mass spectrometers may transform atoms or molecules of interest (e.g., analyte) into gas-phase ions (a process which may be referred to as ionization) in order to separate the ions by their mass-to-charge ratio (m/z). Mass spectrometers (e.g., ion detector) may produce a signal even when the analyte is not present, which may be referred to as a background signal. Increasing the ion energy produced by the ionization process may enable mass spectrometers to advantageously produce an analyte signal (change in ion detector response to the presence of the analyte) that is distinguishable from the background signal.

In addition, different ionization sources ionize some analytes better than others (e.g., produce higher levels of ion energy from the analyte). For example, various ionization sources may produce ion energy according to the analyte's molecular weight and polarity. As disclosed herein, mass spectrometers may use different combinations and permutations of ionization sources to improve detection of some analytes.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Mass Spectrometer

Figure 1:
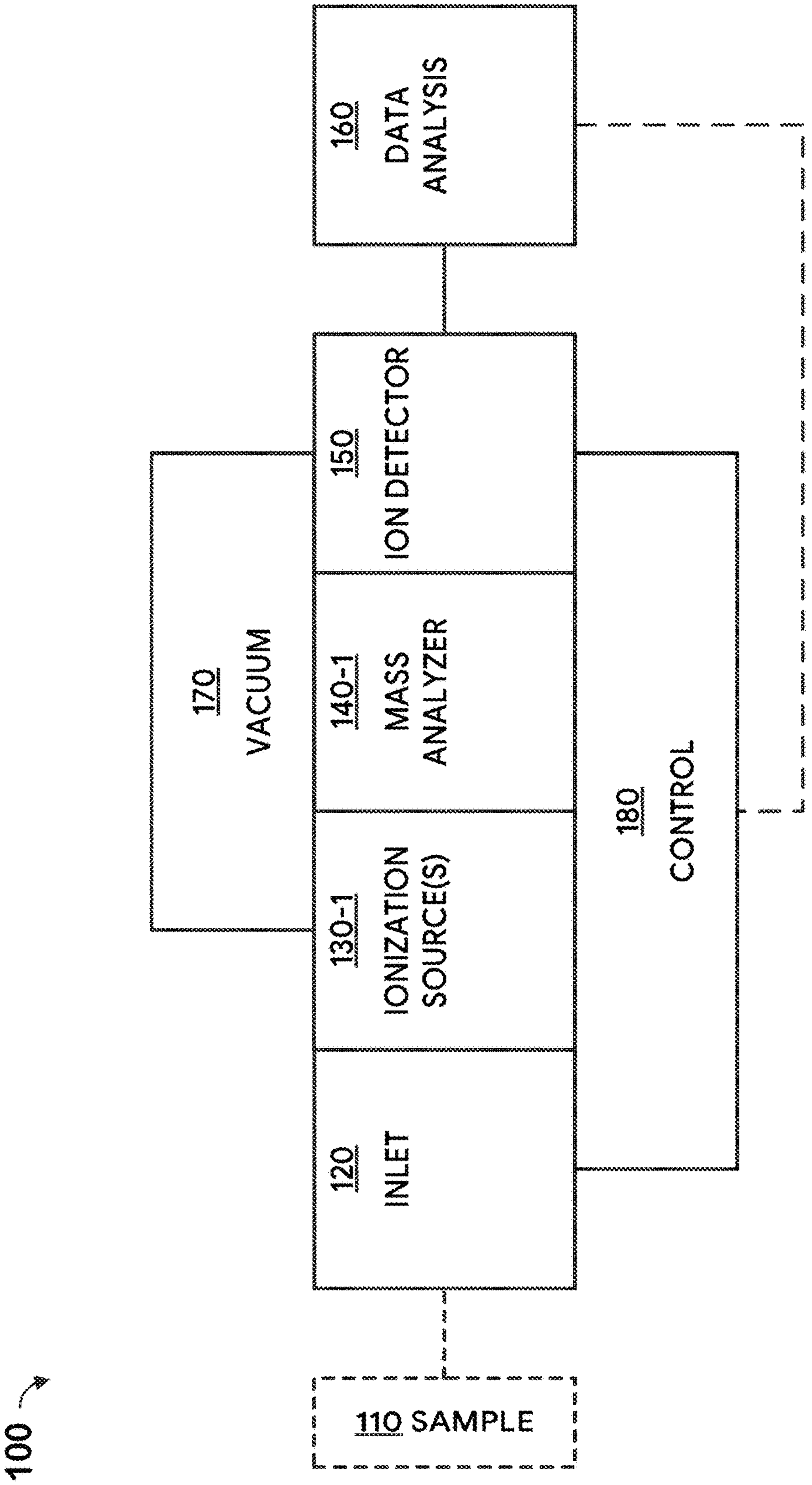
FIG. 1 illustrates a mass spectrometer, according to some embodiments of the disclosure.

FIG. 1 depicts mass spectrometer 100, according to some embodiments. Mass spectrometer 100 may comprise inlet 120, ionization source(s) 130-1, mass analyzer 140-1, ion detector 150, data analysis 160, vacuum 170, and control 180. Although shown as separate blocks, the functions/operations of inlet 120, ionization source(s) 130-1, mass analyzer 140-1, ion detector 150, data analysis 160, vacuum 170, and control 180 may be in various combinations. For example, inlet 120 and ionization source(s) 130-1 may be combined, mass analyzer 140-1 and ion detector 150 may be combined, data analysis 160 and control 180 may be combined, etc. Moreover, functions/operations of inlet 120, ionization source(s) 130-1, mass analyzer 140-1, ion detector 150, data analysis 160, vacuum 170, and control 180 may be in one piece of equipment or separate pieces of equipment. Regardless of configuration, the functions/operations of inlet 120, ionization source(s) 130-1, mass analyzer 140-1, ion detector 150, data analysis 160, vacuum 170, and control 180 may be used to measure sample 110.

Sample 110 (which may be referred to as an analyte) may be the atom or molecule to be analyzed by mass spectrometer 100 in solid, liquid, or gaseous form. Sample 110 may be admitted into mass spectrometer 100 through inlet 120. Inlet 120 maybe a capillary, metering valve, and the like. Typically, sample 110 may be at ambient pressure (e.g., in a range from 100 torr to 760 torr) and may be introduced into mass spectrometer 100 such that the vacuum inside mass spectrometer 100 remains relatively unchanged. For example, sample 110 may be introduced into mass spectrometer 100 through direct insertion with a probe or plate, direct infusion or injection into ionization source(s) 130-1, and the like.

In direct insertion with a probe, sample 110 may be placed on a probe and the probe may be inserted into ionization source(s) 130-1 through inlet 120 which may be a vacuum interlock. Sample 110 may be heated to facilitate thermal desorption or subjected to high-energy desorption processes, such as laser desorption, to facilitate vaporization and ionization. In direct infusion or injection, capillary or a capillary column may be used to introduce sample 110 as a gas or in solution.

Ionization source(s) 130-1 may ionize neutral particles of sample 110. In other words, ionization source(s) 130-1 may place a positive or negative charge on a constituent atom(s) and/or molecule(s) of sample 110, producing ions. Ions may be atoms or molecules with a net electric charge due to the loss or gain of one or more electrons. The methods used for ionization may determine what types of substances (e.g., species of sample 110) can be analyzed by mass spectrometer 100 and may be selected based on the analyte's molecular weight and polarity. By way of non-limiting example, atmospheric pressure ionization methods may include electrospray ionization (ESI), atmospheric pressure chemical ionization (APCI), paper spray (PSI), dielectric barrier discharge ionization (DBDI), matrix-assisted laser desorption ionization (MALDI), direct analysis in real-time (DART), and the like. Atmospheric pressure ionization methods may ionize analytes under ambient pressure (e.g., in a range from 100 torr to 760 torr). Other ionization methods may be used.

Mass analyzer 140-1 may separate or sort the ions produced by ionization source(s) 130-1 according to their mass-to-charge (m/z) ratio. The m refers to the molecular or atomic mass number and z to the charge number of the ion, but the quantity of m/z is dimensionless. Mass analyzer 140-1 may use static or dynamic fields, and magnetic or electric fields. Mass analyzer 140-1 may accelerate and decelerate ions, deflect ions, shoot ions into defined orbits or other flight paths, and the like. For example, positive ions created in ionization source(s) 130-1 may accelerate towards negative plates in mass analyzer 140-1 at a speed dependent on their mass (e.g., lighter ions move quicker than heavier ones). The ions may further be deflected by a magnetic field, where the extent of deflection depends on the mass of the ions and their charge (e.g., lighter ions are deflected more than heavier ones, and ions with 2 (or more) positive charges are deflected more than ones with only 1 positive charge).

Ion detector 150 may measure a mass-to-charge (m/z) ratio for the ions separated and/or sorted by mass analyzer 140-1. For example, ion detector 150 may record the charge induced or the current produced when the sorted ions pass by or hit a surface. The ion current may be measured using a Faraday detector or a secondary electron multiplier (SEM). Because the number of ions leaving mass analyzer 140-1 at a particular instant may be low, ion detector 150 may include amplification, such as a microchannel plate (MCP), to produce a signal.

Data analysis 160 may process the ion currents measured by ion detector 150 and present these currents, for example, as the mass spectra shown in FIGS. 7A-7D. For example, data analysis 160 may receive the measurements from ion detector 150. By way of further non-limiting example, control 180 may receive the measurements from ion detector 150 and provide them to data analysis 160. Control 180 may communicate with data analysis 160 through a bus, over a wired or wireless network, and the like.

Figure 8:
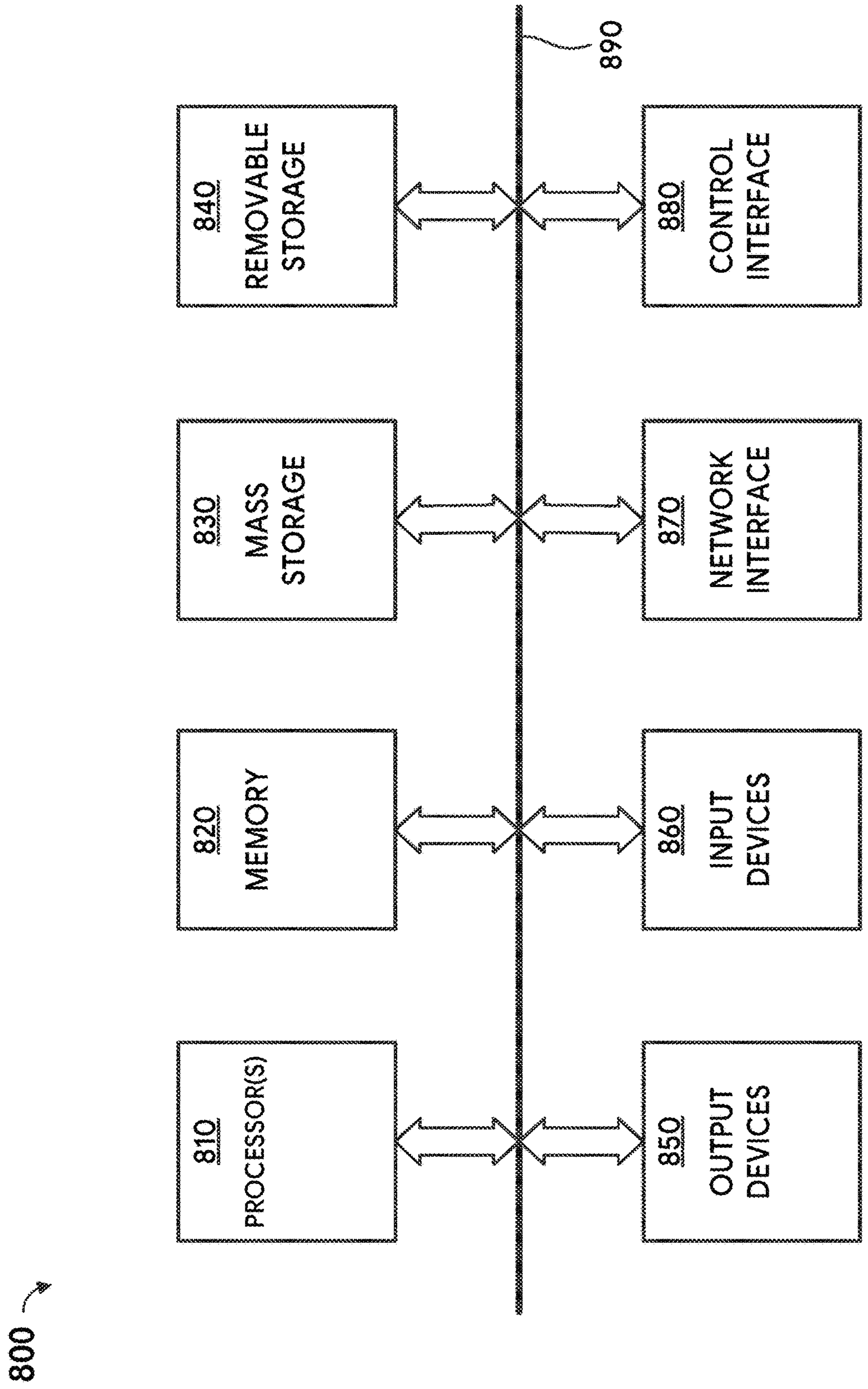
FIG. 8 illustrates a computer system, in accordance with some embodiments of the disclosure.

Data analysis 160 may calculate and store mass-to-charge ratios (m/z) ratios for the ions along with their relative abundance. The mass-to-charge ratio (m/z) denotes the quantity formed by dividing the mass of an ion by the unified atomic mass unit and by its charge number (positive absolute value). In other words, the mass-to-charge ratio (m/z) represents a relationship between the mass of a given ion and the number of elementary charges that it carries. The ion's relative abundance denotes a signal intensity of the ions. Relative abundance may also be referred to as relative intensity. Data analysis 160 may be an embodiment of computer system 800 (FIG. 8).

Vacuum 170 may produce a vacuum in various parts of mass spectrometer 100. Vacuum 170 may include a pump. For example, vacuum 170 may produce a vacuum to move sample 110 into to ionization source(s) 130-1 through inlet 120. By way of further non-limiting example, vacuum 170 may remove residual or background gas species from sections of mass spectrometer 100 to reduce signal losses (from analyte collisions with residual gases) and contamination (from analyte reactions with residual gases). For pressures between 0.5 torr to 760 torr, a pump may be, for example, a diaphragm pump, scroll pump, rotary vane pump, and the like. For pressures between $10^{-10}$ to 10 millitorr (mTorr), a ("high vacuum") pump may be employed, for example, a turbomolecular pump, cryogenic pump, diffusion pump, and the like.

Figure 2:
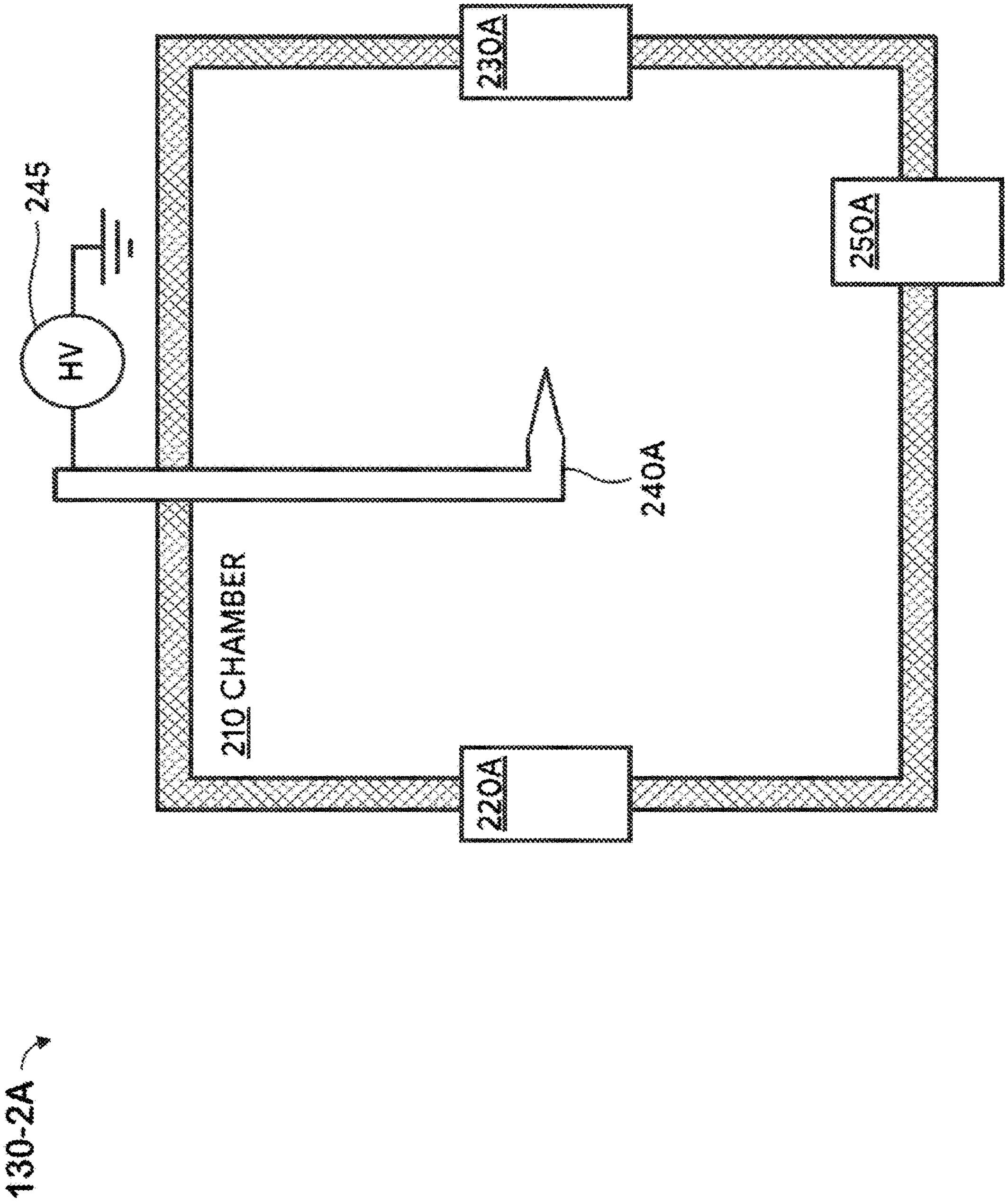
FIG. 2 illustrates atmospheric pressure chemical ionization, according to various embodiments of the disclosure.

Control 180 may control operation of inlet 120, ionization source(s) 130-1, mass analyzer 140-1, ion detector 150, and vacuum 170. Control 180 may be an embodiment of computer system 800 (FIG. 8). At a high level, control 180 may turn mass spectrometer 100 on or off by coordinating the activation or deactivation of inlet 120, ionization source(s) 130-1, mass analyzer 140-1, ion detector 150, and vacuum 170. Also at a high level, control 180 may monitor a state (health) of spectrometer 100 by determining if measurements (feedback) from inlet 120, ionization source(s) 130-1, mass analyzer 140-1, ion detector 150, and vacuum 170 are within predetermined optimum (operating) ranges. By way of further non-limiting example, control 180 may receive measurements from and/or control: inlet 120 to allow a metered amount of sample 110 into ionization source(s) 130-1, vacuum 170 to maintain a pressure inside mass spectrometer 100 (e.g., ionization source(s) 130-1), high-voltage source(s) to maintain a supplied voltage(s), Atmospheric Pressure Chemical Ionization FIG. 2 illustrates atmospheric pressure chemical ionization (APCI) 130-2A, according to various embodiments. APCI 130-2A may be an embodiment of ionization source(s) 130-1 that uses gas-phase ion-molecule reactions at ambient pressure (e.g., approximately 1 atm or 101,325 Pa). APCI 130-2A may typically be used to ionize substances with a medium to high polarity and/or molecular weights in a range from 100 Da to 1,000 Da (unified atomic mass unit: dalton or u). Description of APCI 130-2A is made with reference to FIG. 1. APCI 130-2A may include chamber 210, inlet 220A, outlet 230A, electrode 240A, high-voltage source 245, and vacuum port 250A.

Inlet 220A may be a (controlled) opening in chamber 210 through which an analyte (e.g., sample 110) is introduced into APCI 130-2A. For example, inlet 220A may be an embodiment of inlet 120.

Outlet 230A may be a (controlled) opening in chamber 210 though which analyte and ions exit APCI 130-2A. For example, outlet 230A may be a capillary, metering valve, vacuum interlock, and the like. Chamber 210 may be made of aluminum, stainless steel, polyether ether ketone (PEEK), and the like.

Electrode 240A may be electrically coupled to high-voltage source 245. For example, electrode 240A may be made of stainless steel, tungsten, and the like. Typically, electrode 240A has a pointed, tapered, and sharp tip/end, as shown. Electrode 240A may be referred to as a corona discharge electrode. Although electrode 240A is shown having an "L" shape, other shapes such as straight (e.g., like a straight needle) may be used. High voltage source 245 may supply a voltage in the range of 2.0 to 6.0 kilovolts (kV) DC.

Vacuum port 250A may be coupled to vacuum 170 and introduce a vacuum to chamber 210. For example, a vacuum may be used to move sample 110 into chamber 210.

In operation, sample 110 may be introduced to APCI 130-2A through inlet 220A. Sample 110 may be a gas and enter with air. Typically, air includes nitrogen gas ($N_2$), oxygen gas ($O_2$), and water ($H_2O$).

In chamber 210, a high voltage placed on electrode 240A may create a corona discharge. Electrode 240A creates an electric field strong enough to ionize nearby molecules (e.g., $N_2$ and $O_2$). For example, the corona discharge generates electrons and the electrons charge the nitrogen gas and oxygen gas. The charged molecules (e.g., $N_2^+$ and $O_2^+$) pass a charge to an ionization reagent (e.g., water ($H_2O$)) in chamber 210. The charged ionization reagent (e.g., $H_2O^+$) interacts with neutral water ($H_2O$) producing $H_3O^+$. The $H_3O^+$ interacts with the analyte (e.g., sample 110), passing a hydrogen atom ($H^+$) to the analyte, which ionizes the analyte. Although, positive mode ionization is described, negative mode ionization may be used. The ions produced and analyte not ionized exit chamber 210 through outlet 230A.

APCI 130-2A may be sensitive to the proton affinity of the ionization reagent. For example, when the ionization reagent is water ($H_2O$), the analyte may have a higher proton affinity (e.g., in kJ/mole) than water. The proton affinity of water may be 691 kJ/mole. In the example described above, the analyte takes a charge from water. When the analyte has a higher proton affinity than water, the analyte is more like to take the charge from water. When the analyte has a lower proton affinity than water, the analyte may not take the charge from water, not be ionized, and not produce an analyte signal.

Dielectric-Barrier Discharge Ionization

Figure 3:
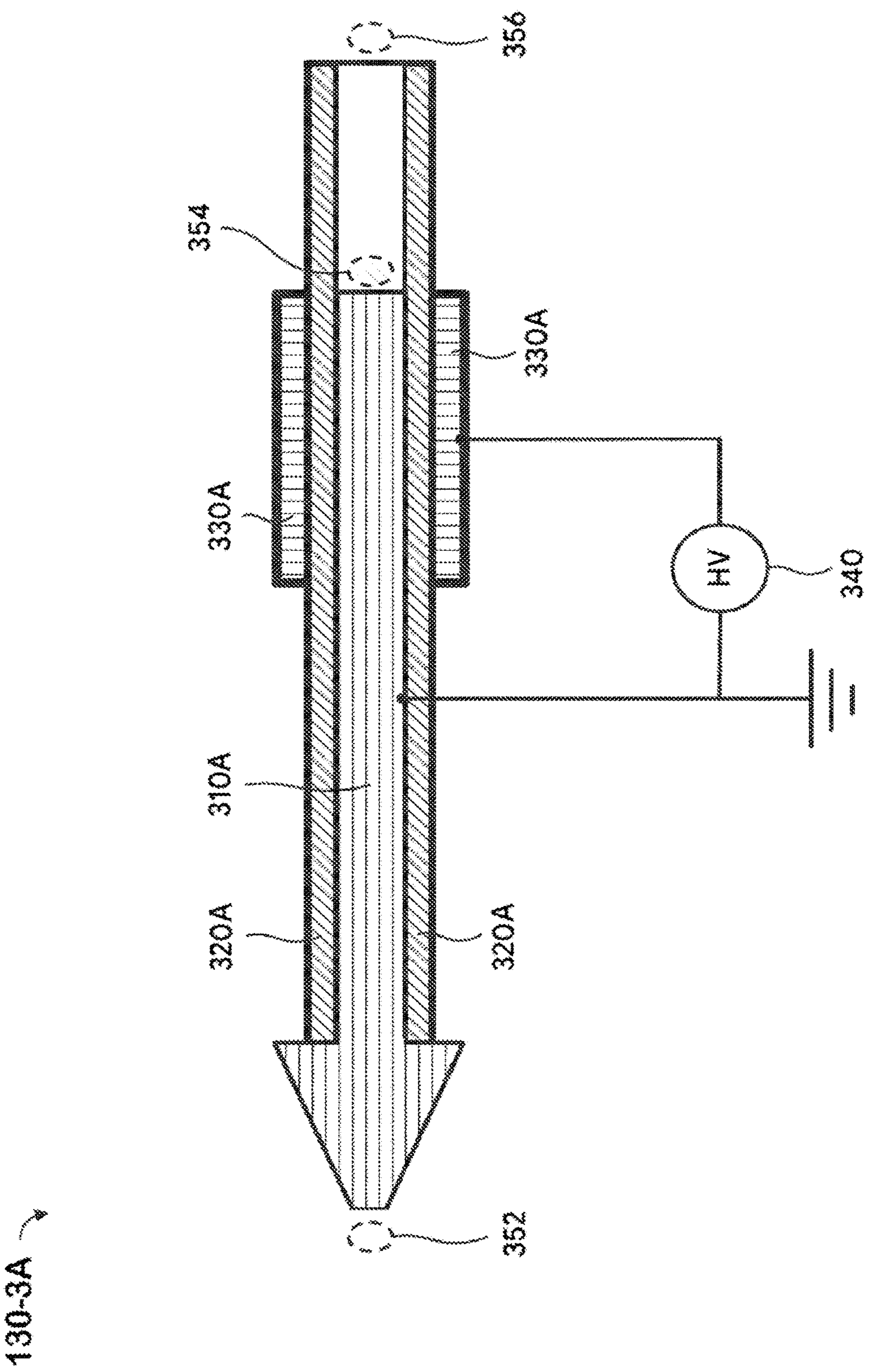
FIG. 3 illustrates dielectric-barrier discharge ionization, in accordance with some embodiments of the disclosure.

FIG. 3 illustrates dielectric-barrier discharge ionization (DBDI) 130-3A, in accordance with some embodiments. DBDI 130-3A may be an embodiment of ionization source(s) 130-1 that uses an electrical discharge between two electrodes separated by an insulating dielectric barrier at ambient pressure (e.g., in a range from 100 torr to 760 torr). DBDI 130-3A may typically be used to ionize substances whose molecules are less polar than the molecules ionizable using APCI due to the different mechanisms in the DBDI plasma. DBDI 130-3A may also ionize some molecules that APCI can ionize. Description of DBDI 130-3A is made with reference to FIG. 1. DBDI 130-3A may include counter electrode 310A, dielectric barrier 320A, high-voltage electrode 330A, and high-voltage source 340, end 352. DBDI 130-3A may have end 352, location 354, and end 356.

As shown, counter electrode 310A may be electrically coupled to electrical ground. Counter electrode 310A may be cylindrical in shape. By way of non-limiting example, counter electrode 310A may be a tube having a diameter in a range between 0.2 mm and 7.0 mm, and having a thickness in a range between 0.1 mm and 3.4 mm. Counter electrode 310A may be made of copper, brass, silver, gold, stainless steel, the like, and combinations thereof. Although depicted as having a conical protrusion at end 352, counter electrode 310 may have a cylindrical shape without this feature. The conical protrusion may advantageously direct gas flow. While shown as being longer than high-voltage electrode 330A at one end, counter electrode 310A may be shorter than high-voltage electrode 330A at either ends.

Dielectric barrier 320A may be a barrier that physically separates counter electrode 310A and high-voltage electrode 330A. Dielectric barrier 320A may be cylindrical in shape. Dielectric barrier 320A may be a tube made of glass, silicate, quartz, polytetrafluoroethylene (Teflon™), other fluoropolymers, ceramic, the like, and combinations thereof. By way of non-limiting example, dielectric barrier 320A may have a diameter in a range between 0.3 mm and 7.0 mm, and a thickness in a range between 0.05 mm and 2.0 mm.

As shown, high-voltage electrode 330A may be electrically coupled to high-voltage source 340. High-voltage electrode 330A may be cylindrical in shape (e.g., a ring electrode). High-voltage electrode 330A may be a tube having a diameter in a range between 0.3 mm and 7.0 mm, and having a thickness in a range between 0.05 mm and 10.0 mm. High-voltage electrode 330A may be made of copper, brass, silver, gold, stainless steel, the like, and combinations thereof. Counter electrode 310A and high-voltage electrode 330A may be coaxial. For example, counter electrode 310A and high-voltage electrode 330A may be two concentric conductors separated by a dielectric barrier 320A.

High-voltage source 340 may be a voltage source providing an electric potential in a range between 1 kV and 15 kV (AC) and an RF frequency of 10 kHz and 40 kHz.

In operation, an analyte (e.g., sample 110) may enter DBDI 130-3A at end 352. Typically, the analyte may be a gas. The electric potential between counter electrode 310A and high-voltage electrode 330A may create a dielectric barrier discharge. The dielectric barrier discharge may ionize the analyte producing plasma (ionized gas), for example, at location 354. The ionized gas may exit DBDI 130-3A at location 356.

Alternatively, the analyte (e.g., sample 110) may enter DBDI 130-3A at end 356 and ionized gas may exit at end 352. Alternatively, high-voltage electrode 330A may be electrically grounded and high-voltage source 340 may be applied to counter electrode 310A.

In contrast to APCI 130-2A, DBDI 130-3A may not use an ionizing reagent and may not be sensitive to proton affinity.

Dual Source Ionization

Figure 4A:
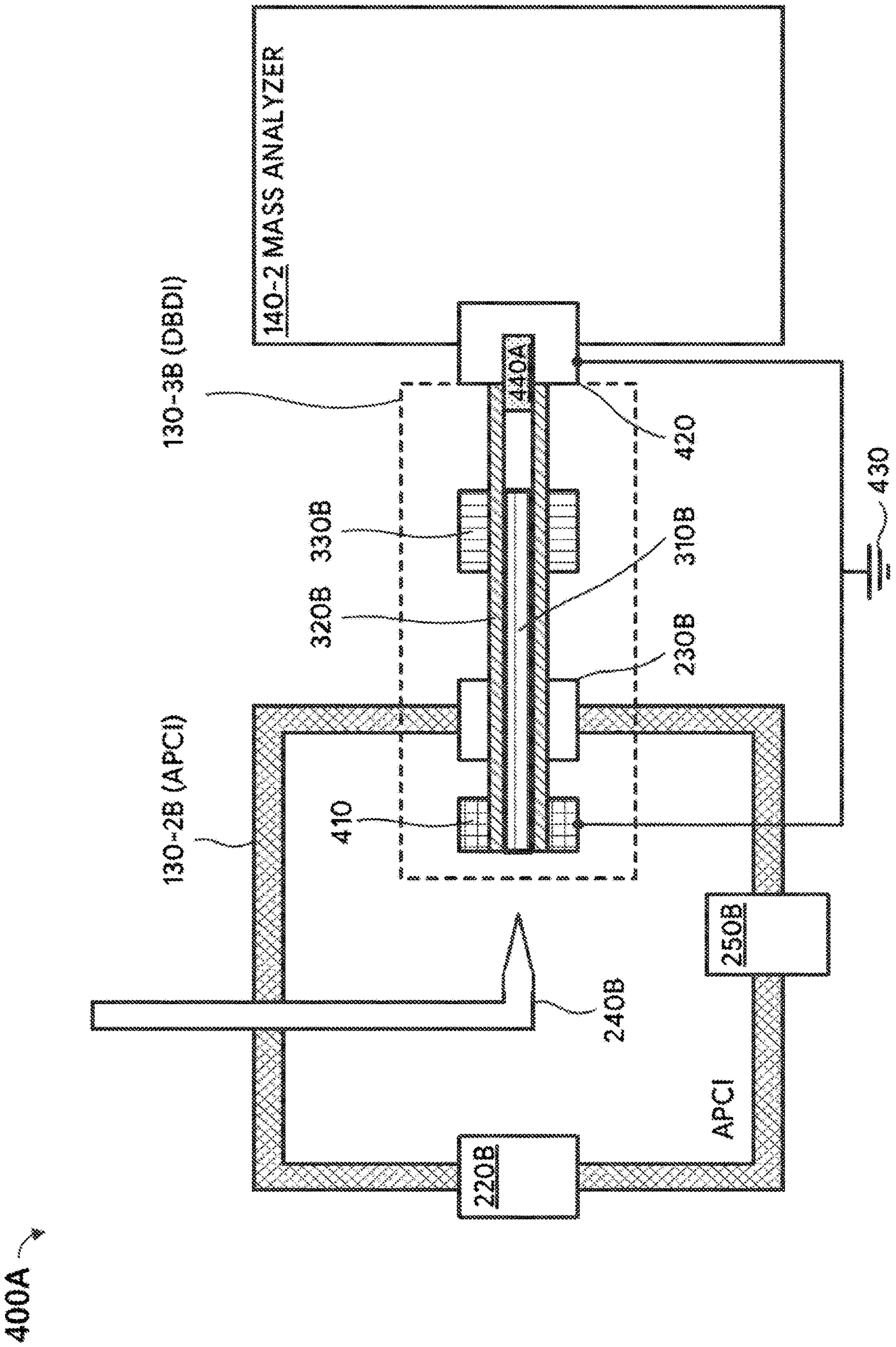
FIGS. 4A and 4B illustrate multi-modal ionization, in accordance with various embodiments of the disclosure.

FIG. 4A shows a mass spectrometer section 400, in accordance with some embodiments. Mass spectrometer section 400 may include atmospheric pressure chemical ionization (APCI) 130-2B, dielectric-barrier discharge ionization (DBDI) 130-3B, and mass analyzer 140-2. APCI 130-2B may be an embodiment of APCI 130-2A (FIG. 2). Some elements of APCI 130-2A, while present in APCI 130-2B, may not be shown in FIG. 4A for pictorial clarity. DBDI 130-3B may be an embodiment of DBDI 130-3A (FIG. 3). Some elements of DBDI 130-3A, while present in DBDI 130-3B, may not be shown in FIG. 4A for pictorial clarity. Mass analyzer 140-2 may be an embodiment of mass analyzer 140-1 (FIG. 1). Mass spectrometer section 400 may advantageously perform two ionization methods on an analyte (e.g., sample 110) at the same time. Typically, mass spectrometer section 400 may advantageously operate on analytes having a molecular weight in a range between 50 Da and 10,000 Da.

APCI 130-2B may include inlet 220B, outlet 230B, electrode 240B, and vacuum port 250B. Inlet 220B, outlet 230B, electrode 240B, and vacuum port 250B may be embodiments of inlet 220A, outlet 230A, electrode 240A, and vacuum port 250, respectively. DBDI 130-3B may include counter electrode 310B, dielectric barrier 320B, high-voltage electrode 330B, and ring electrode 410. Counter electrode 310B, dielectric barrier 320B, and high-voltage electrode 330B may be embodiments of counter electrode 310A, dielectric barrier 320A, and high-voltage electrode 330A, respectively. Electrode 240B and high-voltage electrode 330B may be electrically coupled to different high-voltage sources (not depicted).

As shown, dielectric barrier 320B may be electrically connected to the chamber, which may be grounded by the mass spectrometer, similar to inlet 420. Alternatively or additionally, ring electrode 410 may electrically couple an end of APCI 130-2B inside of DBDI 130-3B to electrical ground. For example, ring electrode may be copper foil wrapped around the end of dielectric barrier 320B which is then electrically coupled to electrical ground through a copper wire. The copper wire may enter/exit the chamber through a hermetically sealed feedthrough. In other words, an end of DBDI 130-3B inside of APCI 130-2B is electrically coupled to electrical ground.

Tube 440A may connect DBDI 130-3B to mass analyzer 140-2. For example, tube 440A may be partially inserted (e.g., 1.0 mm to 5.0 mm deep) into a cylinder (pipe) formed by dielectric barrier 320B. Tube 440 may be connected to inlet 420. Ions (e.g., plasma) from DBDI 130-3B may flow through tube 440A to inlet 420. Tube 440A may be made from stainless steel, copper, glass, and the like.

Mass analyzer 140-2 may include inlet 420. Ions from APCI 130-2B and DBDI 130-3B may be admitted into mass analyzer 140-2 through inlet 420. Inlet 420 maybe a capillary, metering valve, vacuum interlock, and the like. Conventionally, a voltage is applied to the inlet of a mass analyzer to facilitate the movement of ions into the mass analyzer. Instead, inlet 420 may be electrically coupled to electrical ground, in some embodiments.

In operation, the analyte (e.g., sample 110) may enter mass spectrometer section 400 through inlet 220B. Although some parts of the analyte may be ionized in APCI 130-2B (e.g., ionized analyte), other parts of the analyte may not be ionized in APCI 130-2B (e.g., not-ionized analyte). After some parts of the analyte are ionized in APCI 130-2B, the ionized analyte and not-ionized analyte may exit APCI 130-2B and enter DBDI 130-3B through outlet 230A. The not-ionized analyte may be ionized in DBDI 130-3B. In other words, APCI may not ionize all the molecules in the analyte, and the molecules not ionized by APCI proceed to ionization by DBDI. After the not-ionized analyte is ionized in DBDI 130-3B, the ionized analyte (e.g., ionized by APCI 130-2B and DBDI 130-3B) may exit DBDI 130-3B and enter mass analyzer 140-2 through inlet 420.

Figure 4B:
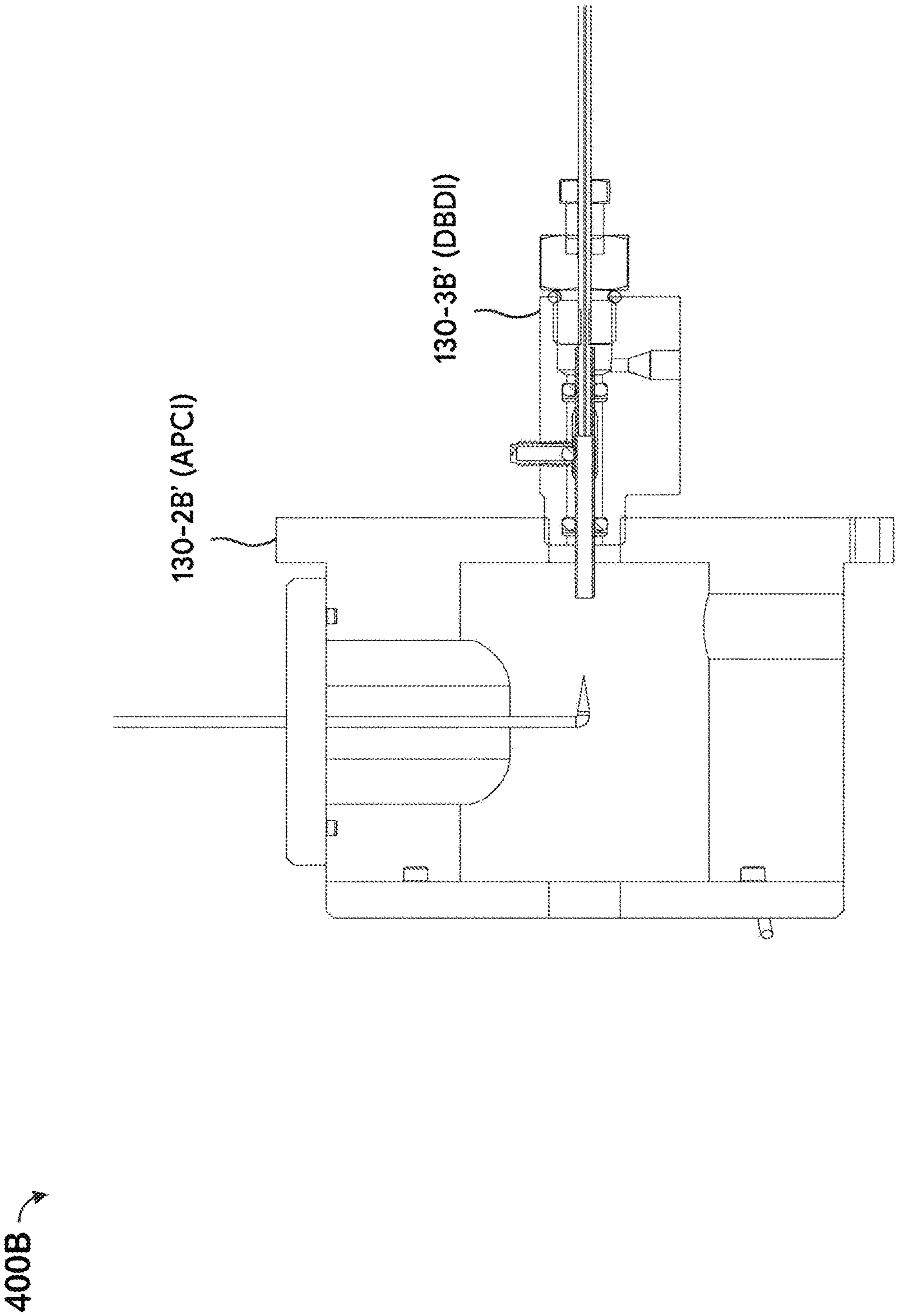

FIG. 4B illustrates configuration 400B including APCI 130-2B' and DBDI 130-3B', according to some embodiments. APCI 130-2B' and DBDI 130-3B' may be embodiments of APCI 130-2B and DBDI 130-3B, respectively.

Figure 5A:
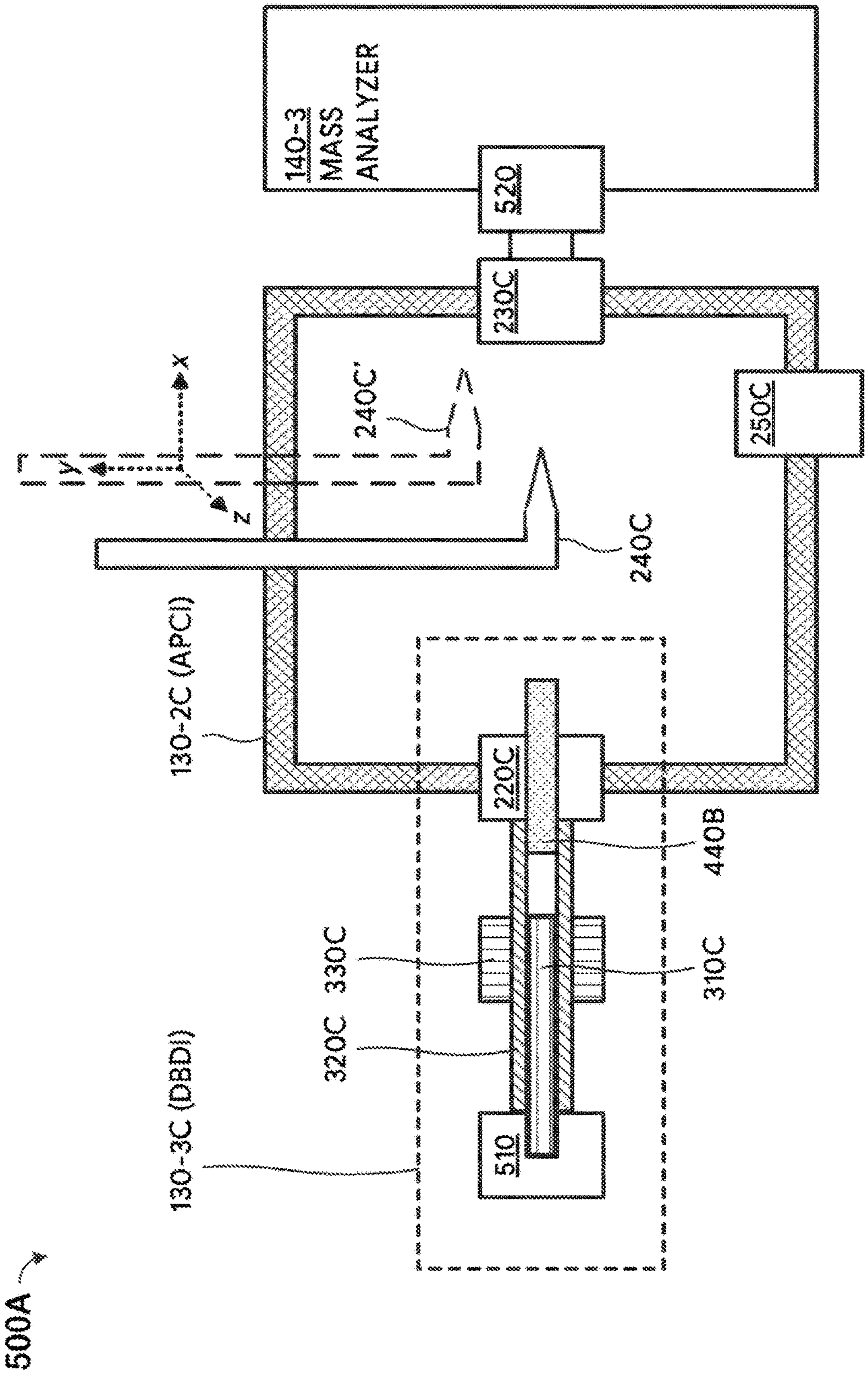
FIGS. 5A and 5B illustrate further multi-modal ionization, according to some embodiments of the disclosure.

FIG. 5A shows another mass spectrometer section 500, in accordance with various embodiments. Mass spectrometer section 500 may include dielectric-barrier discharge ionization (DBDI) 130-3C, atmospheric pressure chemical ionization (APCI) 130-2C, and mass analyzer 140-3. DBDI 130-3C may be an embodiment of DBDI 130-3A (FIG. 3). Some elements of DBDI 130-3A, while present in DBDI 130-3C, may not be shown in FIG. 5A for pictorial clarity. APCI 130-2C may be an embodiment of APCI 130-2A (FIG. 2). Some elements of APCI 130-2A, while present in APCI 130-2C, may not be shown in FIG. 5A for pictorial clarity. Mass analyzer 140-3 may be an embodiment of mass analyzer 140-1 (FIG. 1). Mass spectrometer section 500 may advantageously perform two ionization methods on an analyte (e.g., sample 110) at the same time. Typically, mass spectrometer section 500 may advantageously operate on analytes having a molecular weight in a range between 50 Da and 10,000 Da.

Tube 440B may connect DBDI 130-3C to inlet 220C of APCI 130-C. Tube 440B may be an embodiment of tube 440A.

DBDI 130-3C may include counter electrode 310C, dielectric barrier 320C, and high-voltage electrode 330C. Counter electrode 310C, dielectric barrier 320C, and high-voltage electrode 330C may be embodiments of counter electrode 310A, dielectric barrier 320A, and high-voltage electrode 330A, respectively. APCI 130-2C may include inlet 220C, outlet 230C, electrode 240C, and vacuum port 250C. Inlet 220C, outlet 230C, electrode 240C, and vacuum port 250C may be embodiments of inlet 220A, outlet 230A, electrode 240A, and vacuum port 250, respectively. Electrode 240C and high-voltage electrode 330C may be electrically coupled to different high-voltage sources (not shown).

Electrode 240C may be in line (or aligned) with plasma exiting DBDI 130-3C through tube 440B. Alternatively, electrode 240C may be offset from DBDI 130-3C, such that electrode 240C does not block or obstruct plasma flowing into the chamber of APCI 130-2C through tube 440B. For example, electrode 240C may be shifted (e.g., 1.0 mm to 5.0 mm) along a z-axis, such as depicted by electrode 240C'.

In operation, the analyte (e.g., sample 110) may enter mass spectrometer section 500 through inlet 510. Although some parts of the analyte may be ionized in DBDI 130-3C (e.g., ionized analyte), other parts of the analyte may not be ionized in DBDI 130-3C (e.g., not-ionized analyte). After some parts of the analyte are ionized in DBDI 130-3C, the ionized analyte and not-ionized analyte may exit DBDI 130-3C and enter APCI 130-2C through inlet 220C. The not-ionized analyte may be ionized in APCI 130-2C. That is, DBDI may not ionize all the molecules in the analyte, and the molecules not ionized by DBDI proceed to ionization by APCI. After the not-ionized analyte is ionized in APCI 130-2C, the ionized analyte (e.g., ionized by DBDI 130-3C and APCI 130-2C) may exit APCI 130-2C and enter mass analyzer 140-3 through inlet 520.

Figure 5B:
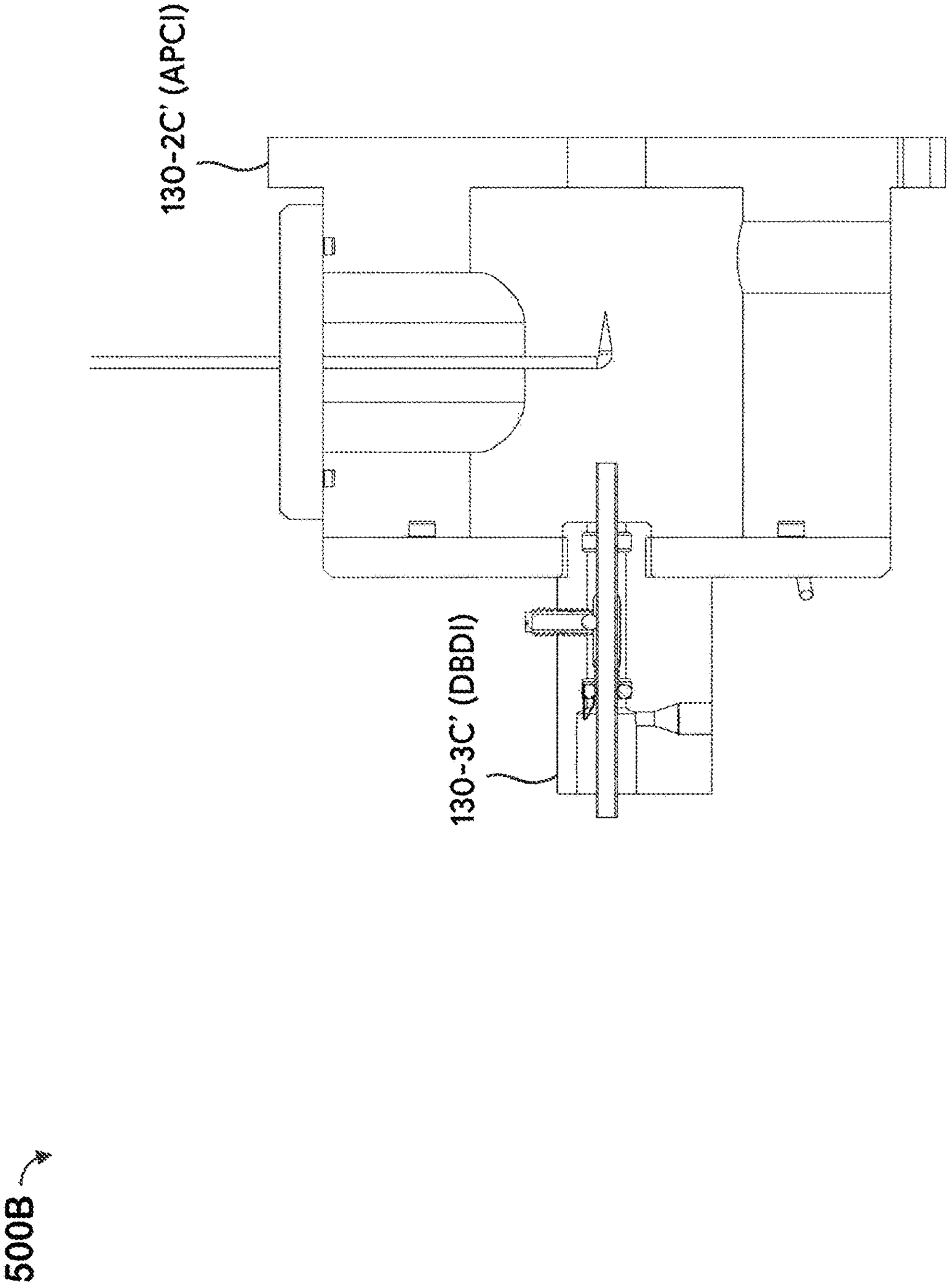

FIG. 5B illustrates example 500B of DBDI 130-3C and APCI 130-2C, according to some embodiments. For example, DBDI 130-3C may ionize incoming analyte and neutral gas/vapor and APCI 130-2C may act as a second ionization, which increases the number of ions formed as well as ionizing analyte molecules that have poor response using DBDI.

Although APCI and DBDI ionization are described in the foregoing and following illustrative examples, it will be appreciated that the present disclosure is not limited to APCI and DBDI, and is applicable to other ionization methods. Moreover, while two ionization sources are described, more than two ionization sources may be used.

Multi-Modal Ionization Workflow

Figure 6:
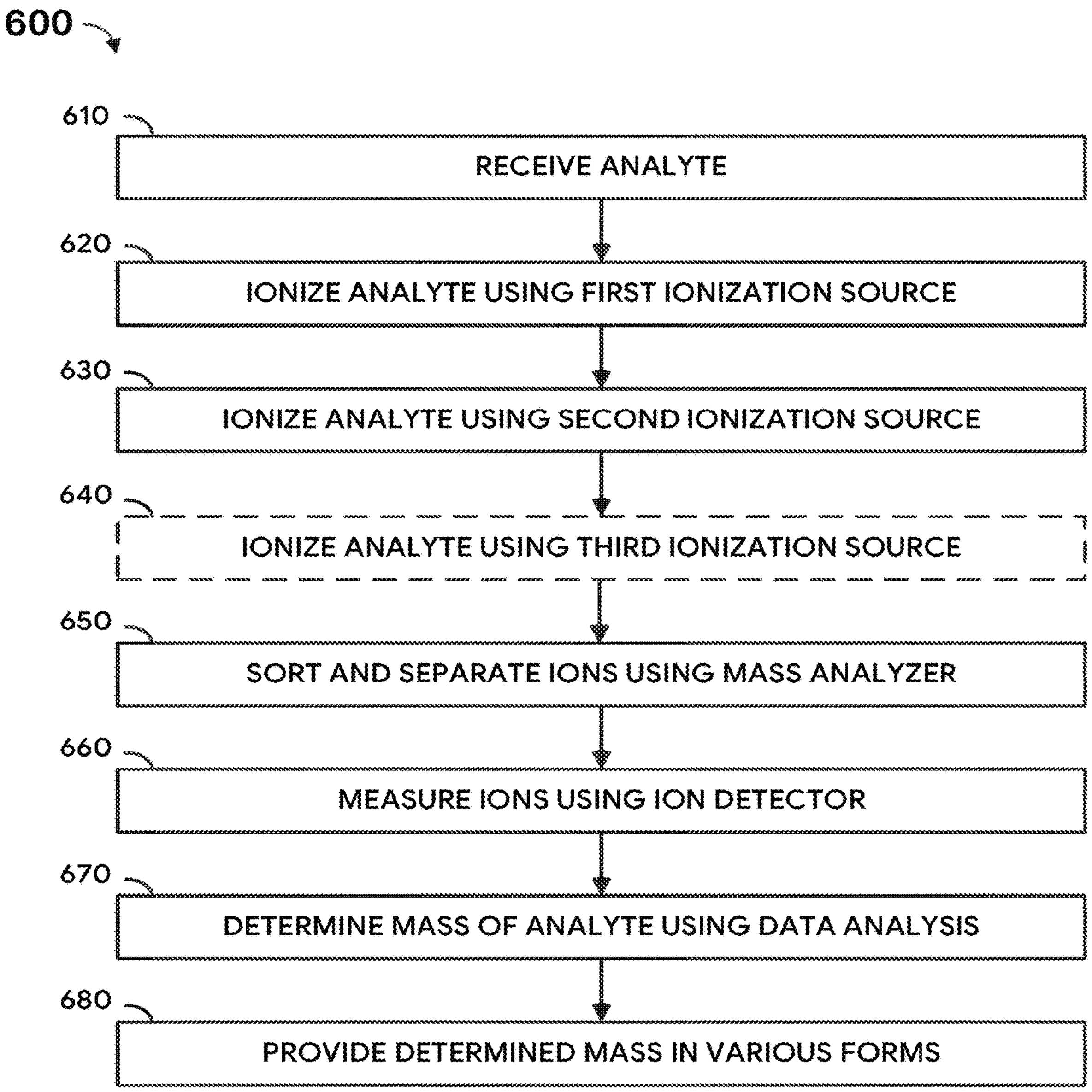
FIG. 6 illustrates a workflow for dual-source ionization, according to various embodiments of the disclosure.

FIG. 6 shows workflow 600 for multi-modal ionization, according to some embodiments. At least some of workflow 600 may be performed by mass spectrometer 100, mass spectrometer section 400, and mass spectrometer section 500. Description of workflow 600 will be made with reference to FIGS. 1-5. The flow of operations performed by mass spectrometer 100, mass spectrometer section 400, and another mass spectrometer section 500 is not necessarily limited to the order of operations shown.

Workflow 600 may commence at step 610, where an analyte (e.g., sample 110) is received. For example, sample 110 may enter ionization source(s) 130-1, APCI 130-2B, and DBDI 130-3C through inlet 120, inlet 220B, and inlet 510, respectively. At step 620, an ionization source may ionize the analyte (e.g., sample 110). For example, ionization source 130-1, APCI 130-2B, and DBDI 130-3C may place a positive or negative charge on molecules of the analyte, generating ions.

The first ionization method may not ionize some molecules of the analyte (e.g., sample 110). For example, the analyte may comprise molecules that are not ionized well (e.g., does not produce an analyte signal that is distinguishable from a background signal) by ionization source 130-1, APCI 130-2B, and DBDI 130-3C. At step 630, a second ionization source may ionize molecules of the analyte not ionized (or partially ionized) by the first ionization source. For example, another of ionization source 130-1, DBDI 130-3B, and APCI 130-2C may place a positive or negative charge on molecules of the analyte—that were not ionized by the first ionization source (e.g., ionization source 130-1, APCI 130-2B, and DBDI 130-3C)—producing ions. The ions generated by the first ionization source and the second ionization source may be provided to a third ionization source or a mass analyzer.

At step 640, a third ionization source may optionally ionize molecules of the analyte not (or partially) ionized by the first and second ionization sources. Although, three ionization sources are described, any number of ionization sources may be applied.

At step 650, a mass analyzer may sort and/or separate the generated ions based on their mass-to-charge ratio (m/z). For example, mass analyzer 140-1, mass analyzer 140-2, and mass analyzer 140-3 may sort and separate the generated ions using static or dynamic fields, and magnetic or electric fields.

At step 660, an ion detector may measure the sorted and separated ions. For example, ion detector 150 may measure a charge or ion current of the sorted and separated ions. At step 670, a data analysis system may determine a mass of the analyte using the measurements of the sorted and separated ions. For example, data analysis 160 may produce a mass spectrum. A mass spectrum may be an intensity vs. mass-to-charge ratio (m/z) graph, plot, or chart (or tabular data underlying such graphical representations). Example mass spectrums are provided in FIGS. 7A-7D. At step 680, a mass spectrum (or other representation) may be provided to a user or operator of mass spectrometer 100. For example, the mass spectrum or other representation may be displayed, printed, or written to a data file.

Mass Spectra

FIGS. 7A-7D illustrate example mass spectra of analyte methyl ethyl ketone (also referred to as MEK, $C_4H_8O$, and 2-butanone) (e.g., at m/z 73.11 Da), according to various embodiments. A mass spectrum may be the m/z ratios of the ions present in an analyte plotted against their relative abundance. Each peak in a mass spectrum shows a component of unique m/z in the sample, and heights of the peaks connote the relative abundance of the various components in the sample. MEK is used for illustrative purposes and other analytes may be used.

Figure 7A:
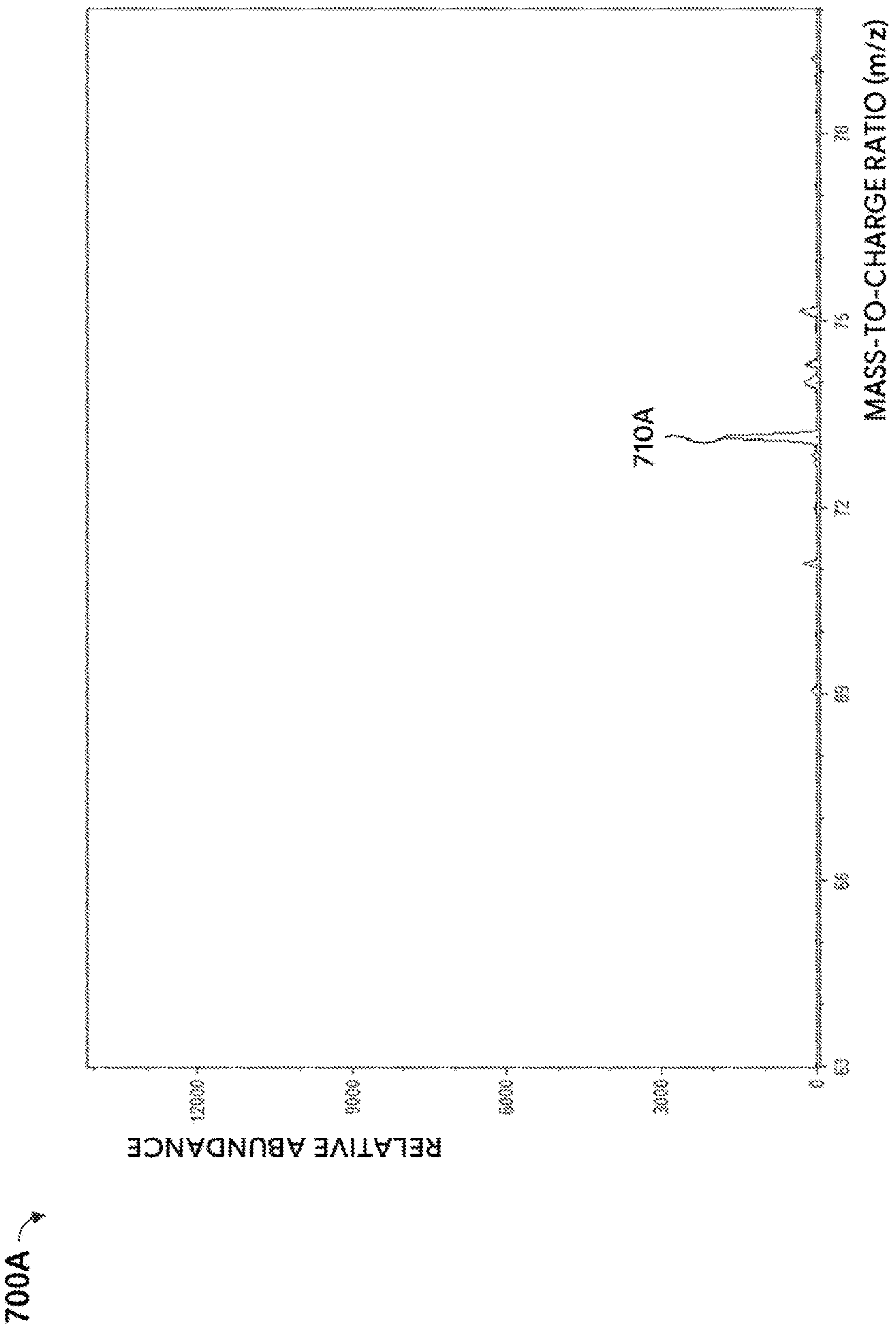
FIGS. 7A-7D illustrate mass spectra, in accordance with some embodiments.
Figure 7B:
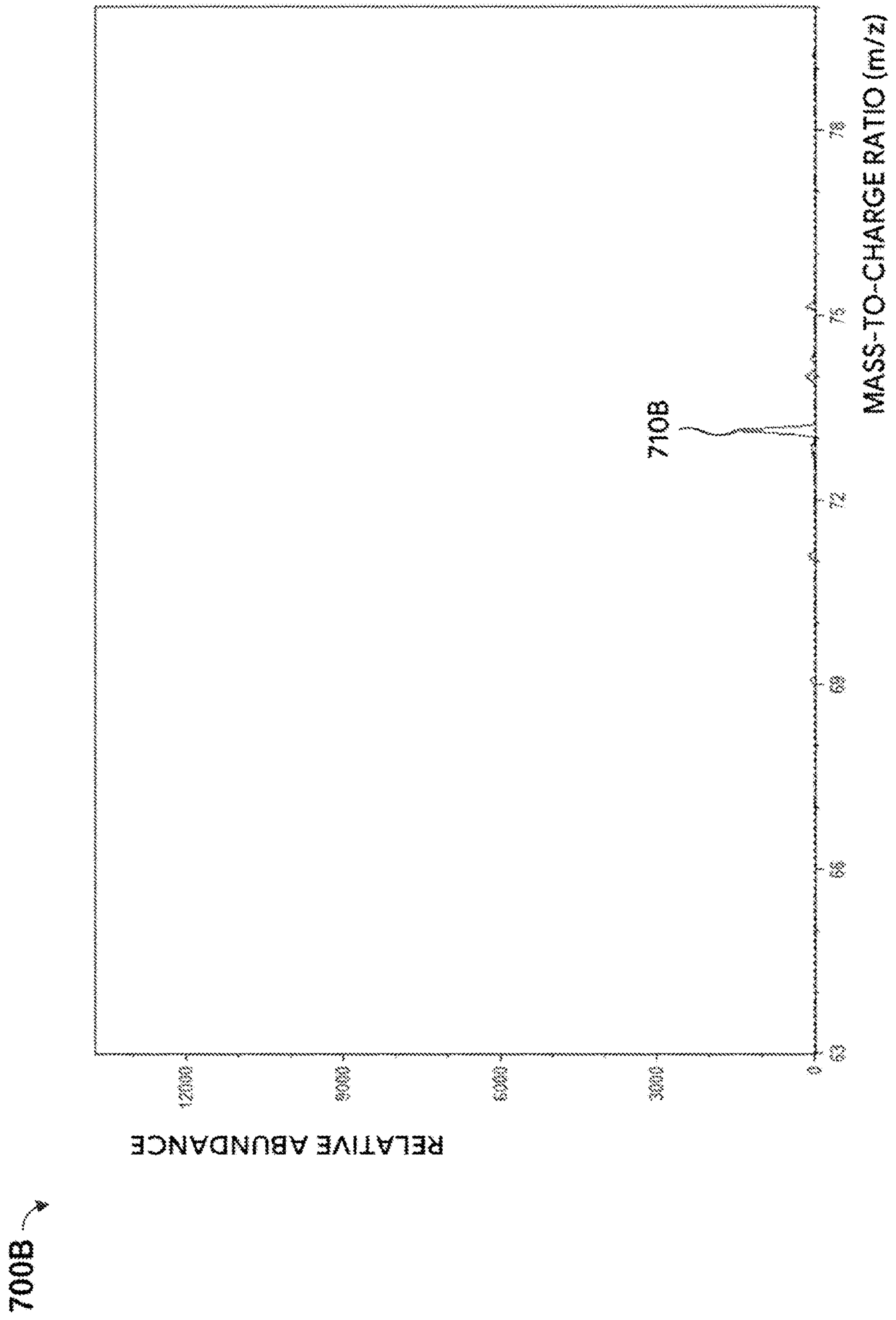
Figure 7C:
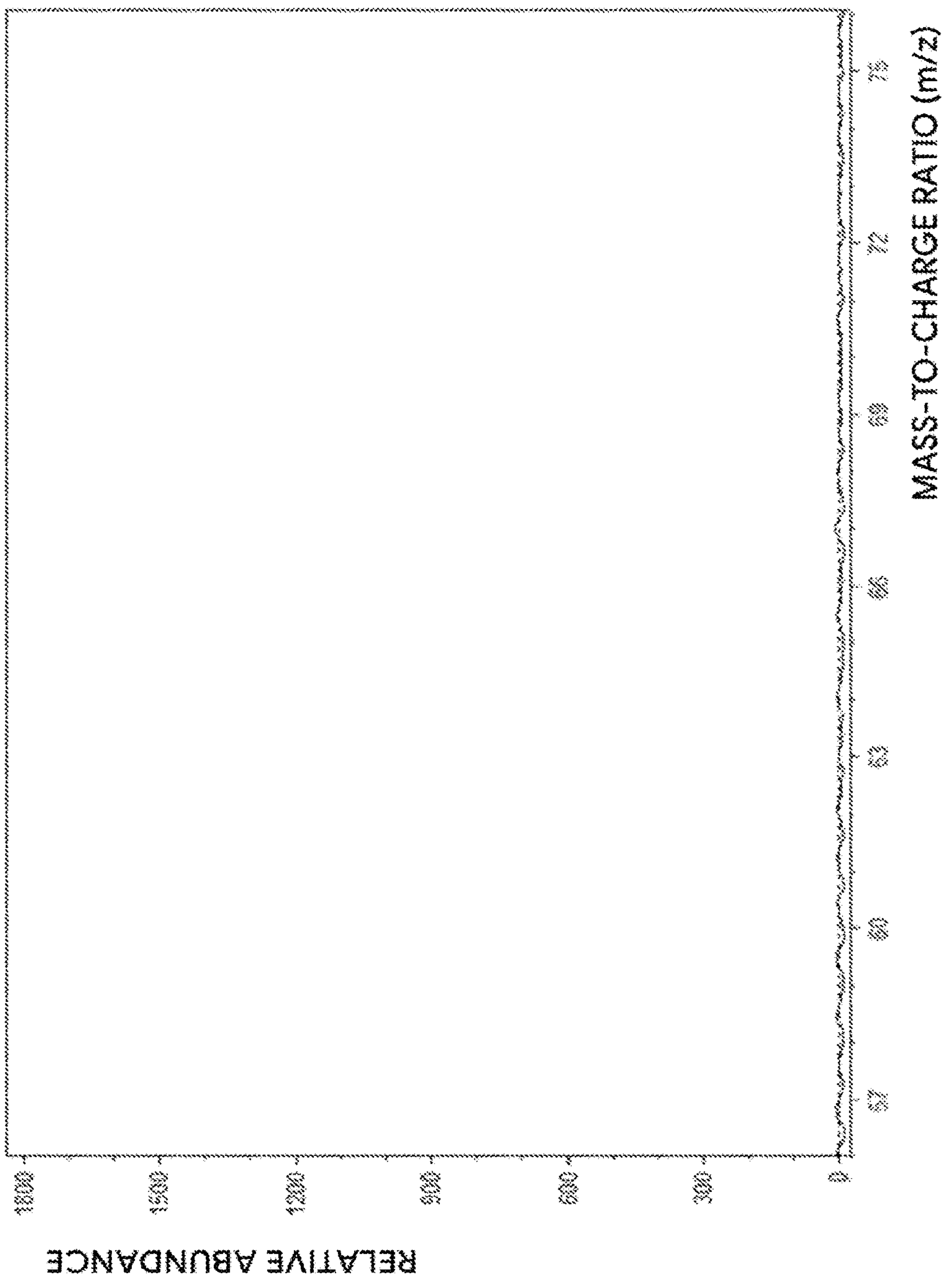
Figure 7D:
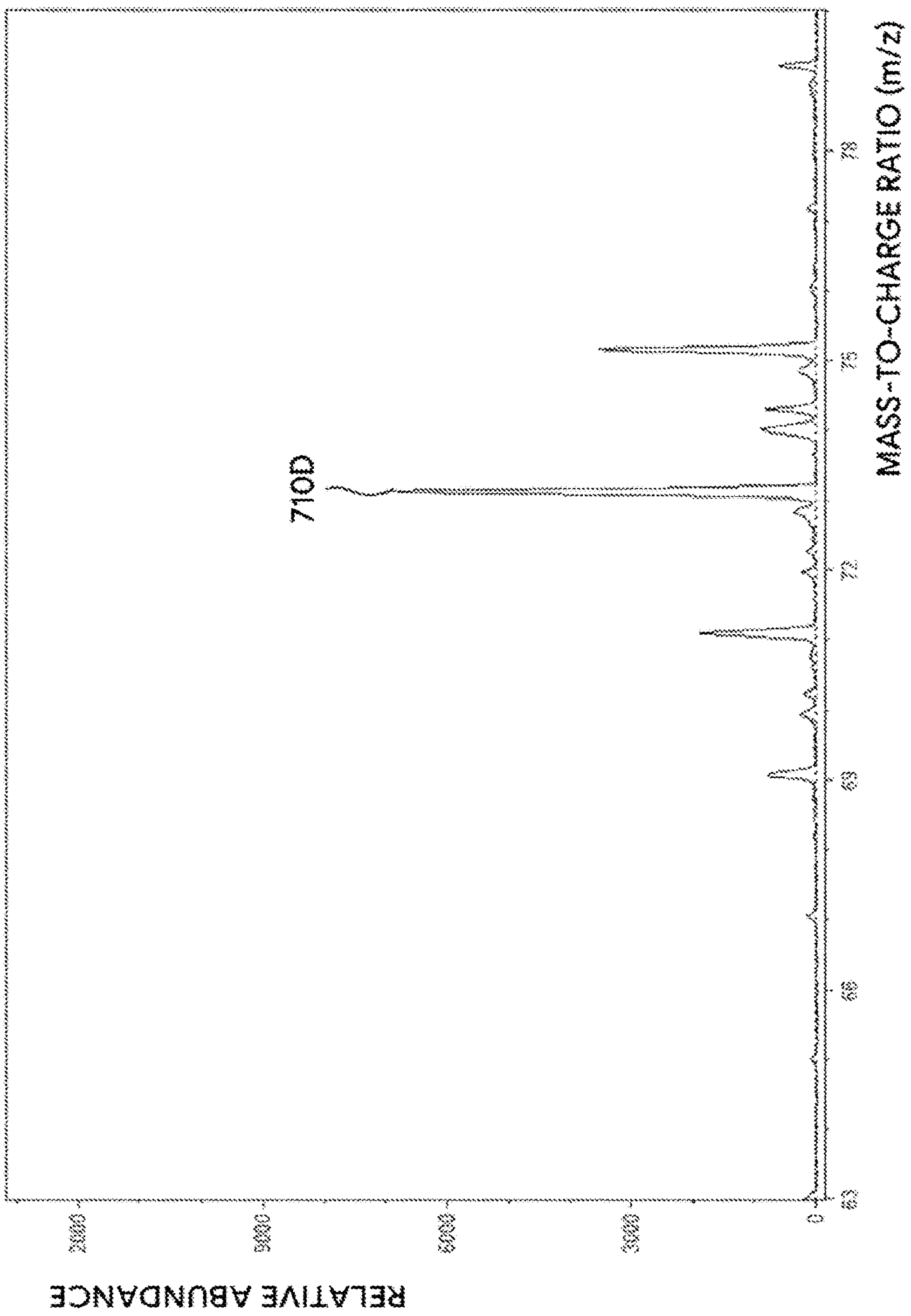

FIG. 7A shows a mass spectrum 700A of MEK measured in a mass spectrometer (e.g., mass spectrometer 100), where the ionization method (e.g., ionization source(s) 130-1 is atmospheric pressure chemical ionization (APCI), such as depicted in FIG. 2. Peak 710A represents the mass spectra produced using APCI. FIG. 7B shows mass spectrum 700B of MEK measured in a mass spectrometer (e.g., mass spectrometer 100), where the ionization method (e.g., ionization source(s) 130-1) is dielectric-barrier discharge ionization (DBDI), such as depicted in FIG. 3. Peak 710A represents the mass spectra produced using DBDI. FIG. 7C shows mass spectrum 700C of MEK measured in a mass spectrometer (e.g., mass spectrometer 100), where the ionization method (e.g., ionization source(s) 130-1) is APCI and DBDI, such as depicted in FIG. 4A, but without the additional electrical grounding. There are no discernable peaks in mass spectrum 700C. FIG. 7D shows mass spectrum 700D of MEK measured in a mass spectrometer (e.g., mass spectrometer 100), where the ionization method (e.g., ionization source(s) 130-1) is APCI and DBDI, such as depicted in FIG. 4A, with the additional electrical grounding. Peak 710D represents the mass spectra produced using APCI and DBDI with the additional electrical grounding. Signals other than peaks 710A-710D may not represent components of the analyte and may be background signals in the mass spectrometer.

Peaks 710A and 710B are lower than peak 710D, which indicates the ionization technique used to produce spectrum 700D may produce a stronger analyte signals than the techniques used to produce spectra 700A-700C. In fact, the relative abundance of peak 710D is over twice as big as the relative abundance of peaks 710A and 710B. As shown in FIG. 7D, the ionization method—for example, ionization source(s) 130-1) used to produce (e.g., APCI and DBDI, such as depicted in FIG. 4A, with the additional electrical grounding—may advantageously produce an analyte signal that is distinguishable from a background signal. For example, the higher peak (or greater relative abundance) may be more readily distinguished from the weaker (lower relative abundance) background signal.

Computer System

FIG. 8 depicts a simplified block diagram of example computer system 800, in some embodiments. Computer system 800 may be used to implement any of the computing devices, systems, or servers described in the foregoing disclosure, such as data analysis 160 and control 180 (FIG. 1). Computer system 800 may include combinations of processor(s) 810, memory 820, mass storage 830, removable storage 840, output devices 850, input devices 860, network interface 870, control interface 880, and bus 890.

As shown in FIG. 8, computer system 800 includes one or more processors 810 that may communicate with a number of peripheral devices via a bus 890. Bus 890 can provide a mechanism for communication among the various components and subsystems of computer system 800. Although bus 890 is shown schematically as a single bus, alternative embodiments of bus 890 may utilize multiple busses. For example, processor(s) 810 and memory 820 may communicate via a local microprocessor bus, and the mass storage 830, removable storage 840, output devices 850, input devices 860, network interface 870, and control interface 880 may communicate via one or more input/output (I/O) buses.

Processor(s) 810 may be a general-purpose processor, such as an Inter®/AMD® x86 or ARM® microprocessor, that operates under the control of software stored in a memory, such as memory 820. Memory 820 may include a number of memories including a main random-access memory (RAM) for storage of instructions and data during program execution and a read-only memory (ROM) in which fixed instructions are stored. RAM may include dynamic RAM (DRAM), static RAM (SRAM), and the like. ROM may include electrically erasable programmable ROM (EEPROM), flash memory, and the like. Various operating systems may be used, such as Windows®, Linux®, macOS®, Android™, IOS®, and the like.

Mass storage 830, which may be implemented with a magnetic disk drive, solid state drive, or an optical disk drive, may be a non-volatile storage device for storing data and instructions for use by processor(s) 810. Removable storage 840 may be a removable non-volatile storage medium, such as a flash drive, floppy disk, CD-ROM, Digital Video Disc (DVD), Blu-ray Disc (BD), and Universal Serial Bus (USB) storage device, to input and output data and code to and from computer system 800. Memory 820, mass storage 830, and removable storage 840 may represent non-transitory computer-readable storage media that can store program code and/or data that provide the functionality of embodiments of the present disclosure.

Output devices 850 may include a display subsystem, a printer, or non-visual displays such as audio output devices, and the like. The display subsystem may be, for example, a flat-panel device such as a liquid crystal display (LCD) or organic light-emitting diode (OLED) display. In general, use of the term "output device" is intended to include all possible types of devices and mechanisms for outputting information from computer system 800.

Input devices 860 may include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 800.

Network interface 870 may serve as an interface for communicating data between computer system 800 and other computer systems or networks. Embodiments of network interface 870 may include, for example, an Ethernet card, a Wi-Fi and/or cellular adapter, a modem (e.g., telephone, satellite, cable, ISDN, etc.), digital subscriber line (DSL) units, and the like.

Computer system 800 may communicate with a cloud-based computing environment using network interface 870. Computer system 800 may use resources of the cloud-based computing environment, including combinations of bare-metal servers, cloud processors (e.g., AWS Graviton™ processor, Tensor Processing Unit™, and the like), virtual machines, containers, and the like in one or more data centers. Alternatively, computer system 800 may be a part of a cloud-based computing environment and the functionalities of computer system 800 may be performed in a distributed fashion. For example, computer system 800 may be combinations of a bare metal server(s), virtual machine(s), container(s), and the like.

Control interface 880 may control and receive (sensor) data from other systems. Control interface 880, for example when control 180 (FIG. 1) is an embodiment of computer system 800, may control and receive (sensor) data from inlet 120, ionization source(s) 130-1, mass analyzer 140-1, ion detector 150, and vacuum 170.

It should be appreciated that computer system 800 is illustrative and many other configurations having more or fewer components than system 800 may be used.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

What is claimed is:

1. A method for multi-modal ionization comprising:

receiving an analyte;

ionizing some molecules of the analyte using a first ionization method and a first ionization source to produce first ions;

ionizing other molecules of the analyte using a second ionization method and a second ionization source to produce second ions; and providing the first and second ions to a mass analyzer, wherein the second ionization source comprises a counter electrode and a high-voltage electrode separated by a dielectric barrier, and wherein an end of the dielectric barrier and an inlet of the mass analyzer are electrically coupled to a ground.

2. The method of claim 1 further comprising:

sorting the first and second ions using the mass analyzer;

measuring the ions using an ion detector to generate ion measurements; and providing the ion measurements to a data analysis system, wherein the data analysis system produces a mass spectrum using the ion measurements.

3. The method of claim 1 wherein the first ionization method and the second ionization method are atmospheric-pressure ionization methods.

4. The method of claim 1 wherein the analyte has a molecular weight in a range between 50 Da and 10,000 Da.

5. The method of claim 1 wherein the ionized some molecules have a proton affinity greater than 691 kj/mole.

6. The method of claim 1 wherein the analyte is received using at least one of direct infusion and direct injection.

7. A system for multi-modal ionization, the system comprising:

an inlet receiving an analyte;

a first ionization source coupled to the inlet, the first ionization source ionizing some molecules of the analyte to produce first ions; and a second ionization source coupled to the first ionization source, the second ionization source ionizing other molecules of the analyte to produce second ions, wherein the first ions and the second ions are provided to a mass analyzer, and wherein the second ionization source comprises a counter electrode and a high-voltage electrode separated by a dielectric barrier, and wherein an end of the dielectric barrier and an inlet of the mass analyzer are electrically coupled to a ground.

8. The system of claim 7 further comprising:

the mass analyzer coupled to the second ionization source, the mass analyzer sorting the first ions and the second ions; and an ion detector coupled to the mass analyzer, the ion detector measuring the sorted first ions and the sorted second ions to produce ion measurements, wherein:

the ion detector provides the ion measurements to a data analysis system, and the data analysis system generates a mass spectrum using the ion measurements.

9. The system of claim 7 wherein the first ionization source and the second ionization source each use atmospheric-pressure ionization methods.

10. The system of claim 7 wherein first ionization source uses atmospheric pressure chemical ionization (APCI) and the second ionization source uses dielectric-barrier discharge ionization (DBDI).

11. The system of claim 7, wherein the first ionization source comprises a corona discharge electrode, the corona discharge electrode electrically coupled to a high-voltage source.

12. The system of claim 7 wherein the end of the dielectric barrier is electrically coupled to the ground through a ring electrode.

13. The system of claim 7, wherein the high-voltage electrode is electrically coupled to a high-voltage source in a range between 1 kV and 15 kV.

14. The system of claim 7 wherein the analyte has a molecular weight in a range between 50 Da and 10,000 Da.

15. The system of claim 9 wherein the ionized some molecules have a proton affinity greater than 691 kj/mole.

16. A non-transitory computer-readable storage medium having embodied thereon a program, the program being executable by a processor to perform a method for multimodal ionization, the method comprising:

receiving an analyte;

ionizing some molecules of the analyte using a first ionization method and a first ionization source to produce first ions;

ionizing other molecules of the analyte using a second ionization method and a second ionization source to produce second ions; and providing the first and second ions to a mass analyzer, wherein the second ionization source comprises a counter electrode and a high-voltage electrode separated by a dielectric barrier, and wherein an end of the dielectric barrier and an inlet of the mass analyzer are electrically coupled to a ground.

17. The non-transitory computer-readable storage medium of claim 16, wherein the program, when executed by the processor, perform the method for multimodal ionization further comprising:

sorting the first and second ions using the mass analyzer;

measuring the ions using an ion detector to generate ion measurements; and providing the ion measurements to a data analysis system, wherein the data analysis system produces a mass spectrum using the ion measurements.

18. The non-transitory computer-readable storage medium of claim 16, wherein the program, when executed by the processor, perform the method for multimodal ionization further comprising receiving the analyte using at least one of direct infusion and direct injection.

19. The non-transitory computer-readable storage medium of claim 16, wherein the end of the dielectric barrier is electrically coupled to the ground through a ring electrode.

* * * * *